United States Patent
Saurabh

(10) Patent No.: US 10,528,214 B2
(45) Date of Patent: Jan. 7, 2020

(54) POSITIONING MECHANISM FOR BUBBLE AS A CUSTOM TOOLTIP

(71) Applicant: MICROSOFT TECHNOLOGY LICENSING, LLC, Redmond, WA (US)

(72) Inventor: Saket Saurabh, Dumka (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 165 days.

(21) Appl. No.: 15/481,836

(22) Filed: Apr. 7, 2017

(65) Prior Publication Data
US 2018/0181261 A1    Jun. 28, 2018

(30) Foreign Application Priority Data
Dec. 28, 2016 (IN) .............................. 201641044716

(51) Int. Cl.
- G06F 3/048 (2013.01)
- G06F 3/0481 (2013.01)
- G06F 9/451 (2018.01)

(52) U.S. Cl.
CPC ............ *G06F 3/0481* (2013.01); *G06F 9/451* (2018.02); *G06F 2203/04803* (2013.01)

(58) Field of Classification Search
CPC ................... G06F 3/0481; G06F 9/451; G06F 2203/04803
See application file for complete search history.

(56) References Cited

U.S. PATENT DOCUMENTS

| | | |
|---|---|---|
| 5,546,521 A | 8/1996 | Martinez |
| 7,836,410 B2 | 11/2010 | Vignet |
| 8,527,896 B2* | 9/2013 | Matthews ............. G06F 3/0482 715/711 |
| 2001/0042247 A1* | 11/2001 | Inoue ................. H04N 5/44543 725/1 |
| 2003/0112278 A1* | 6/2003 | Driskell ................. G06F 9/451 715/788 |
| 2007/0061744 A1* | 3/2007 | Smith ..................... G06F 9/451 715/763 |
| 2011/0206116 A1* | 8/2011 | Henocq .................. H04N 19/61 375/240.03 |
| 2013/0097500 A1 | 4/2013 | Rajagopal |
| 2013/0127908 A1 | 5/2013 | Soundararajan |
| 2013/0268837 A1 | 10/2013 | Braithwaite et al. |

(Continued)

OTHER PUBLICATIONS

"How to: Position a Popup", http://web.archive.org/web/20110112024609/http:/msdn.microsoft.com/en-us/library/ms753224(v=vs.85).aspx, Published on: Jan. 12, 2011, 3 pages.

(Continued)

*Primary Examiner* — Haoshian Shih
(74) *Attorney, Agent, or Firm* — Workman Nydegger

(57) ABSTRACT

Optimizations are provided for positioning a popup interface within a display frame in relation to a corresponding target element. In particular, the relative positioning of the popup interface to the associated target element is dynamically selected and selectively determined based on a location of the corresponding target element within one or more quadrants and associated subquadrants of the display frame. As a result, the location of the popup interface is dynamically adjustable as opposed to being positioned based on a predetermined location.

20 Claims, 14 Drawing Sheets

(56) References Cited

U.S. PATENT DOCUMENTS

2014/0092043 A1    4/2014   De leon et al.
2015/0324095 A1   11/2015   Brown et al.

OTHER PUBLICATIONS

"How to: Set the Placement Property for a Popup or Tooltip", http://web.archive.org/web/20110113000617/http:/msdn.microsoft.com/en-us/library/ms750577(v=vs.85).aspx, Published on: Jan. 13, 2011, 11 pages.

* cited by examiner

POSITIONING MECHANISM FOR BUBBLE AS A CUSTOM TOOLTIP

BACKGROUND

Many computer applications employ user interfaces to provide information to users. In some instances, however, a user may need additional information that is not presently displayed but that may be accessible through one or more menus or other tools. One method of presenting this additional information is through the use of a popup interface. These popup interfaces may be configured to dynamically surface, or appear, when a user directs particular input to a target element that is being displayed within the user interface. In particular, these popup interfaces can be configured to display various "context information" associated with the target element. By way of example, the user input may include a hovering action (e.g., from a computer mouse) over a particular target element.

One problem with existing popup interfaces (particularly with regard to one type of a popup interface that is traditionally referred to as a "bubble tooltip") is how they are displayed. In particular, traditional systems display their popup interfaces using hardcoded location coordinates on a user interface template. Because these traditional systems use hardcoded location coordinates, the resulting popup interfaces are always rendered in a fixed position relative to a target element's location. Even further, existing schemes for positioning a popup interface relative to a target element are also limited because the existing positioning schemes fail to account for potential changes to the target element's position when that target element is rendered on the user interface.

The subject matter claimed herein is not limited to embodiments that solve any disadvantages or that operate only in environments such as those described above. Rather, this background is provided to illustrate only one exemplary technology area where some embodiments described herein may be practiced.

BRIEF SUMMARY

Disclosed embodiments include systems and methods for rendering a popup interface at a "best fit" position relative to a particular target element. This target element is "linked" (or otherwise "triggered") to the popup interface. As a result, instead of rendering the popup interface using hardcoded location coordinates, the disclosed embodiments dynamically render the popup interface at a position that is determined to be a "best fit" position with regard to the target element's position, even when that target element changes position or otherwise moves in some manner.

A determination is dynamically made where to display the popup interface by determining which of a plurality of which quadrants (and sometimes subquadrants) the target element is actually being displayed within. In some instances, as the target element moves within the user interface (e.g., perhaps due to a scrolling action of the display or user interface), the relative position of the popup interface is dynamically adjusted so that the popup interface is continuously displayed in a position that is identified as being a "best fit" position relative to the target element. Notably, this positioning action is based on which quadrant/subquadrant the target element is located when the user input is received for triggering the popup.

Certain distinctions are made when determining the relative placement for the popup interface. For example, the embodiments are able to determine whether the target element is located entirely within one quadrant of the display frame or, alternatively, whether the target element spans multiple quadrants. The embodiments utilize different positioning processes for determining where the popup interface will be displayed in relation to the target element when confronted with these different situations.

In some instances, when the target element is entirely within a particular quadrant, that particular quadrant will be subdivided into nine subquadrants. Then, positioning of the popup interface is dependent upon (1) which overall quadrant the target element is located within and (2) which subquadrant(s) the target element is predominantly located within.

In some instances, when the target element is determined to span a plurality of overall quadrants (as opposed to being located within only a single quadrant), then the positioning of the popup interface is selectively dependent upon which of the two quadrants the target element is predominantly located within.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the present embodiments may be realized and obtained by means of the instruments and combinations particularly pointed out in the appended claims. Features of the present embodiments will become more fully apparent from the following description and appended claims, or may be learned by the practice of the embodiments as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
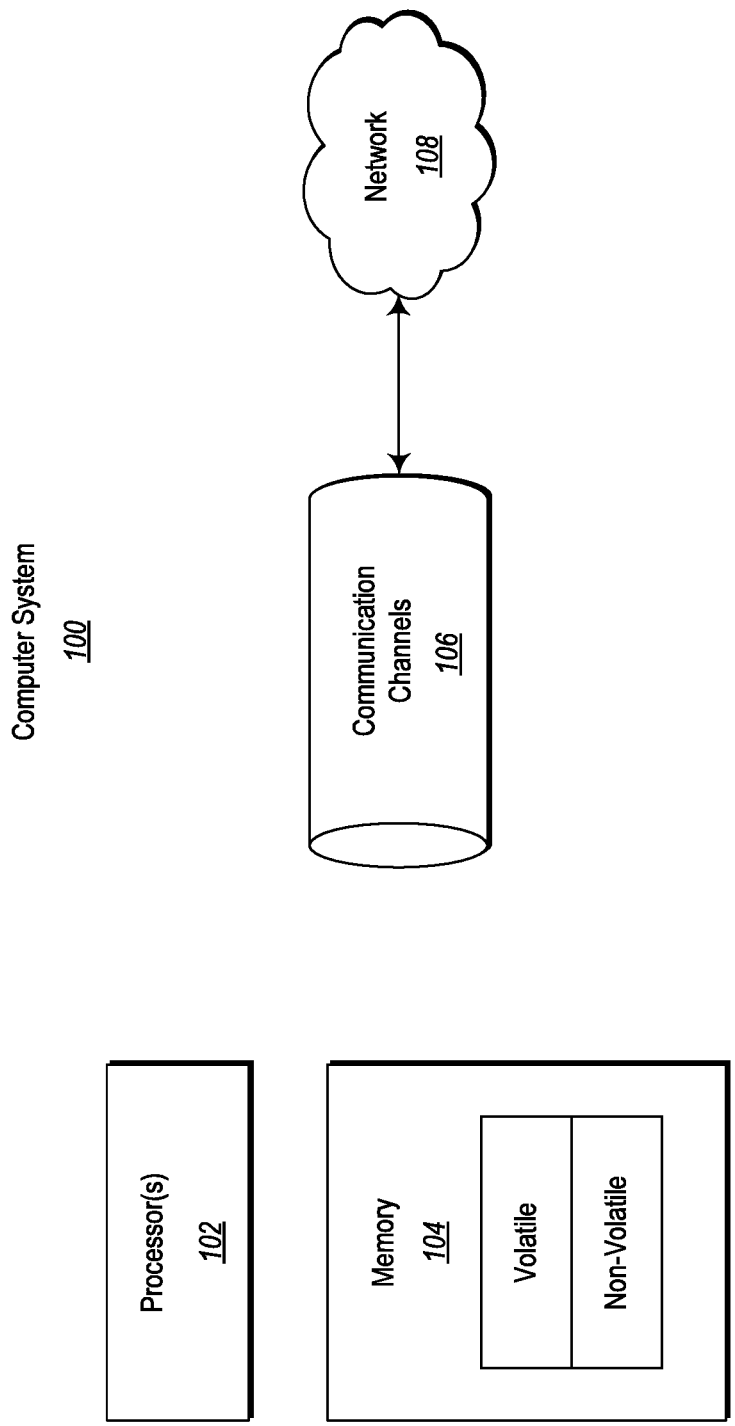
FIG. 1 illustrates a basic architectural view of a computer system that is able to perform the disclosed processes and methods.

The disclosed embodiments may be used to address deficiencies associated with pop-up interfaces. For instance, the disclosed embodiments are able to improve a user's viewing experience by rendering content at optimal locations that can, thereby, improve the layout and readability of documents containing the pop-up interfaces. To ascertain and make use these optimal locations, the disclosed embodiments also improve the computer's efficiency through use of selecting appropriate layout schemes, such as a quadrant scheme, based on detected input. The disclosed embodiments can also be used to improve the computer's performance through use of highly durable and deployable processes. These processes are agnostic with regard to a computer's operating system ("OS") and can be implemented on desktop computers, laptops, tablets, cellphones, or any other type of computing device. Further, these deployable processes can be implemented irrespective of a computer's screen size or screen resolution. These and other benefits of the present embodiments will be discussed more fully hereinafter. Accordingly, for at least these reasons, it should be appreciated that the disclosed embodiments provide technical advantages over the current technological problems associated with identifying the best location to display a pop-up interface, particularly when providing a solution that is applicable to different-sized display screens.

Some disclosed embodiments include systems and methods for rendering a popup interface at a "best fit" position relative to a particular target element. The term "pop interface" may refer to bubbles, bubble interfaces, flyout windows, custom tooltips, linked objects, dialog boxes, modal windows, context menus, and/or to any other dynamically presentable interface element. The term "target element" may refer to input fields, selection fields, user interface ("UI") elements, words, icons, graphical objects, selectable objects, dialog boxes, image links, hyperlinks, and/or to any other type of UI element currently known in the art. The term "best fit" should be interpreted broadly. For example, some embodiments determine that a resulting popup interface's best fit location is at least partially based on a location that maximizes an amount of viewable content for both the underlying user interface and the popup interface itself. Other embodiments determine that the best fit location is at least partially based a location where the resulting popup interface will likely not be cutoff or otherwise occluded. Still other embodiments determine that the best fit location is at least partially based on positional determinations with regard to a particular target element. Regardless, the embodiments discussed herein are able to render a popup interface according to a best fit location.

This target element is "linked" (or otherwise "triggered") to the popup interface (e.g., the target element may be a word or icon, and the resulting popup interface may be a selection menu related to the word or icon). As a result, rather than rendering the popup interface using hardcoded location coordinates, the disclosed embodiments render the popup interface at a position that is determined to be a "best fit" position with regard to the target element's position. To that end, the embodiments dynamically determine where to display the popup interface by initially determining a location of the corresponding target element. This process may be performed by subdividing the user interface (e.g., a display frame of an application) into various quadrants and subquadrants. As referenced herein, the display frame can be the entire display screen or only a predefined interface window/frame of an application interface that has limited dimensions within the display screen.

The disclosed embodiments include the computing system determining which quadrant(s) (and subquadrant(s)) the target element is actually being displayed within. Subsequently, as the target element is moved within the display (e.g., perhaps due to a scrolling of the display or user interface), the relative positioning of the popup interface is dynamically adjusted by the computing system so that the popup interface continues to be displayed in a position that is identified as being a "best fit" position relative to the target element. Notably, this positioning action is based on which quadrant/subquadrant the target element is located when the user input is received.

Therefore, rather than always being positioned using fixed (e.g., hardcoded) location coordinates or a fixed position relative to the target element, the popup interface is selectively positioned within any one of four different positions (e.g., top, bottom, left, or right) relative to the target element. This selective positioning depends on the current position of the target element within the display at the time the popup interface is triggered for display.

Certain distinctions are made when determining the relative placement for the popup interface. For example, the embodiments are able to determine whether the target element is located entirely within one quadrant of the interface display frame or, alternatively, whether the target element spans multiple quadrants. In particular, the embodiments employ different positioning processes, or schemes, for determining where the popup interface will be displayed in relation to the target element when confronted with these different situations.

By way of example, when the target element is entirely within a particular quadrant, that particular quadrant will be divided into nine subquadrants. Then, positioning of the popup interface is dependent upon (1) which overall quadrant the target element is located within and (2) which subquadrant(s) the target element is predominantly located within.

Alternatively, when the target element is determined to span a plurality of overall quadrants (as opposed to being located within only a single quadrant), then the positioning of the popup interface is selectively dependent upon which of the two quadrants the target element is predominantly located within.

Initially, FIG. 1 will be used to present some introductory discussion of a computing system. Following that discussion, the disclosure will present subject matter on an exemplary computer system that is capable of rendering one or more popup interfaces at a best fit location. This discussion will employ FIG. 2. FIGS. 3-11 will then be discussed. These figures provide further detail on determining where a popup interface is to be displayed relative to a target element. Lastly, additional supporting architectures and methods using the novel principles described herein will be discussed with respect to the subsequent figures.

As illustrated in FIG. 1, in its most basic configuration, a computer system 100 typically includes at least one processing unit 102 and memory 104. The memory 104 may be a physical system memory, which may be volatile, non-volatile, or some combination of the two. The term "memory" may also be used herein to refer to non-volatile mass storage such as physical storage media. If the computing system is distributed, the processor, memory, and/or storage capability may be distributed as well. As used here, the term "executable module," "executable component," or even "component" can refer to software objects, routines, or methods that may be executed on the computing system. The different components, modules, engines, and services described herein may be implemented as objects or processors that execute on the computing system (e.g., as separate threads).

Current embodiments may comprise or utilize a special purpose or general-purpose computer including computer hardware, as discussed in greater detail below. The current embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, the embodiments can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

The storage media may store any code for implementing the claimed embodiments and the different positioning schemes and definitions for the interface elements and popup interfaces (e.g., bubbles or other custom tooltips).

The computer system 100 also includes one or more communication channels 106 that are used to communicate with one or more networks 108. A "network" (e.g., the network 108) is defined as one or more data links that enable the transport of electronic data between computer systems (e.g., the computer system 100) and/or modules and/or other electronic devices. When information is transferred, or otherwise provided, over a network 108 or another communications connection (either hardwired, wireless, or a combination of hardwired or wireless) to a computer (e.g., computer system 100), the computer system 100 properly views the connection as a transmission medium. Transmissions media can include a network(s) and/or data link(s) that can be used to carry desired program code means in the form of computer-executable instructions or data structures and that can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network 108 or data link can be buffered in RAM within a network interface module (e.g., a "NIC") and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application/Program-specific Integrated Circuits (ASICs), Application/Program-specific Standard Products (ASSPs), System-on-a-chip systems (SOCs), Complex Programmable Logic Devices (CPLDs), etc.

Figure 2:
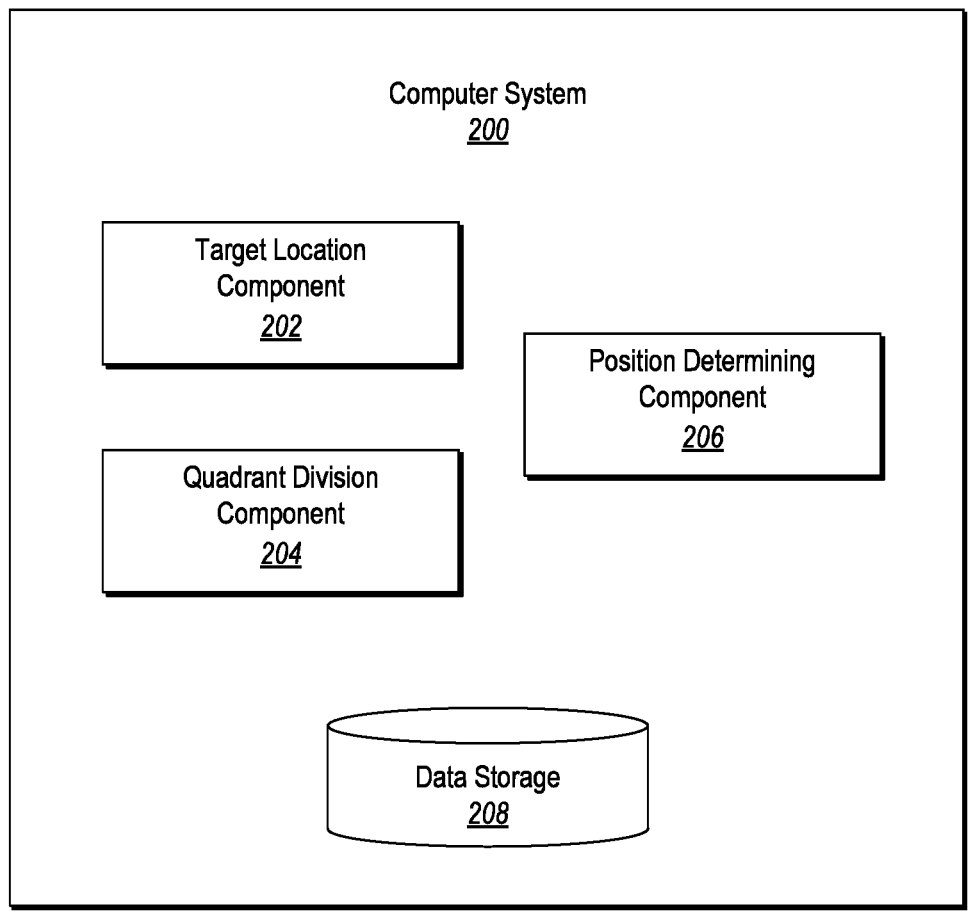
FIG. 2 illustrates another embodiment of a computer system that is able to perform the disclosed processes and methods.

Having just discussed a computer system at an abstract level, FIG. 2 now illustrates an exemplary computer system 200 that includes various components for rendering a popup interface at a best fit location. The computer system 200 is analogous to the computer system 100 presented in FIG. 1. Additional attributes of the computer system 200 will be discussed in connection with the remaining figures. Briefly, however, the computer system 200 is shown as including a target location component 202, a quadrant division component 204, a position determining component 206, and data storage 208. This computer system 200 is able to render a popup interface at a best fit location, where that best fit location is relative to a corresponding target element.

Figure 3:
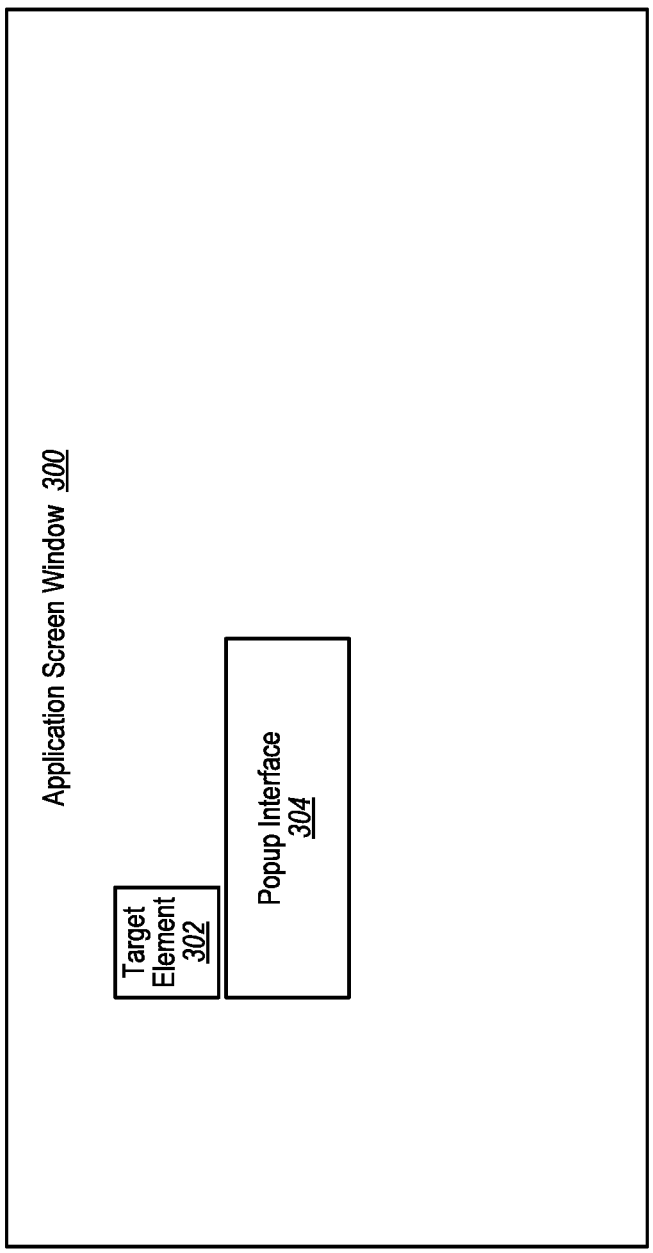
FIG. 3 illustrates an example rendition of a frame/screen window that includes a target element and a corresponding popup interface.

FIG. 3 illustrates an application screen window 300 (e.g., a user interface/display frame) that includes a target element 302. In response to user input that is received at the application screen window and that is associated with the target element 302, a popup interface 304 will also be displayed. As this target element 302 is repositioned within the display frame of the application screen window 300 (e.g., due to scrolling or some other movement of the application screen window 300 or the display), the positioning of the popup interface 304 is dynamically readjusted so that the popup interface 304 continuously remains in a best fit location relative to a current location of the target element 302, or rather, relative to the changing location of the target element 302. This dynamic readjustment occurs when the display of the popup interface 304 is triggered (e.g., in response to the user input associated with the target element 302). If the popup interface 304 continues to be rendered during the scrolling or other movement of the target element 302, then the positioning of the popup interface 304 will also adjust in a corresponding manner so as to perpetually be in a best fit location relative to the target element. This adjustment occurs when the embodiments determine that the target element 302 has moved from a first position to a different position (e.g., to a different quadrant/subquadrant or state/position). Quadrants and subquadrants will be discussed in more detail later.

It will also be appreciated that, in some instances, a determination that a target element is located within one or more particular quadrant(s) or subquadrant(s) may comprise a determination that the target element is predominantly within said particular quadrant or subquadrant(s). More detail on this aspect will also be discussed later.

Different schemes (e.g., algorithms) for positioning the different popup interfaces will now be described using FIGS. 4-11.

Algorithm Logic

Figure 4:
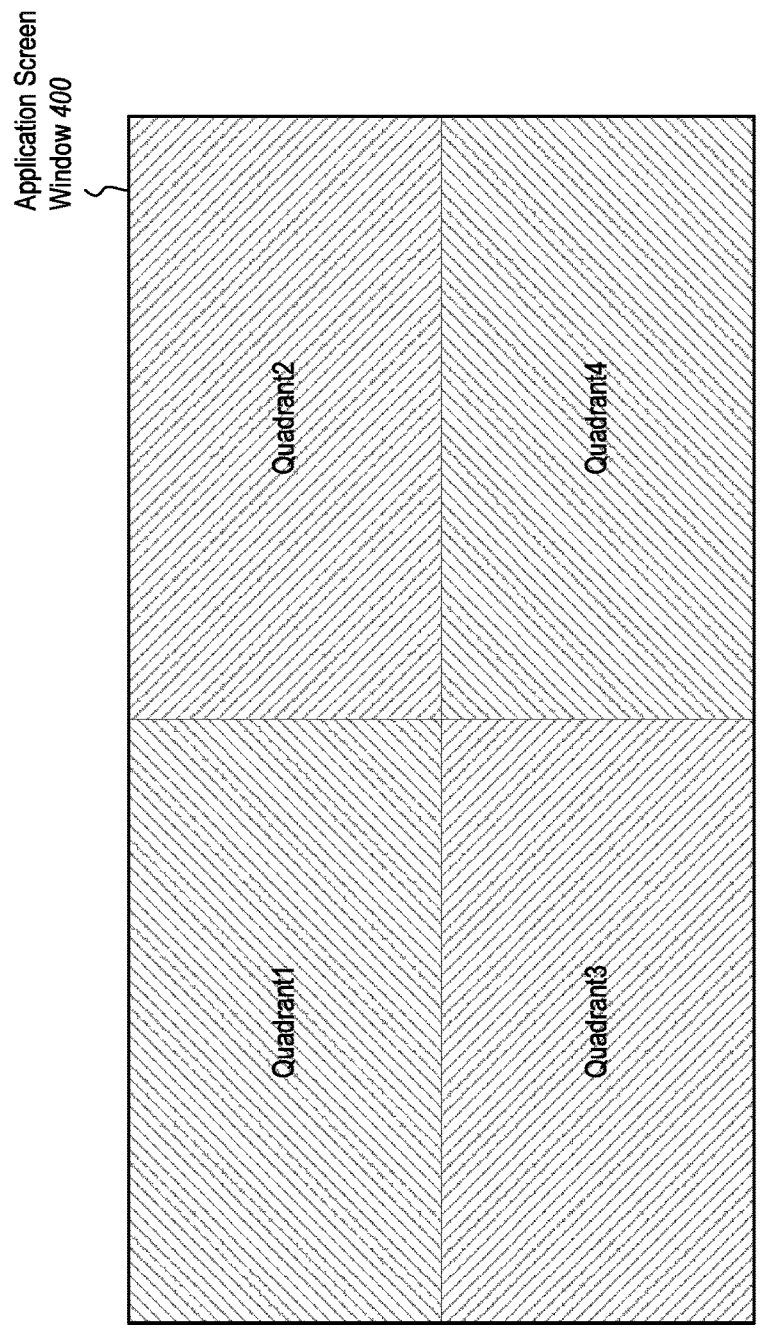
FIG. 4 shows quadrants of a frame/screen window.

As shown in FIG. 4, the embodiments are able to divide the application screen window 400 into four quadrants of equal size. These quadrants are labeled in FIG. 4 as Quadrant1, Quadrant2, Quadrant3, and Quadrant4.

Figure 5:
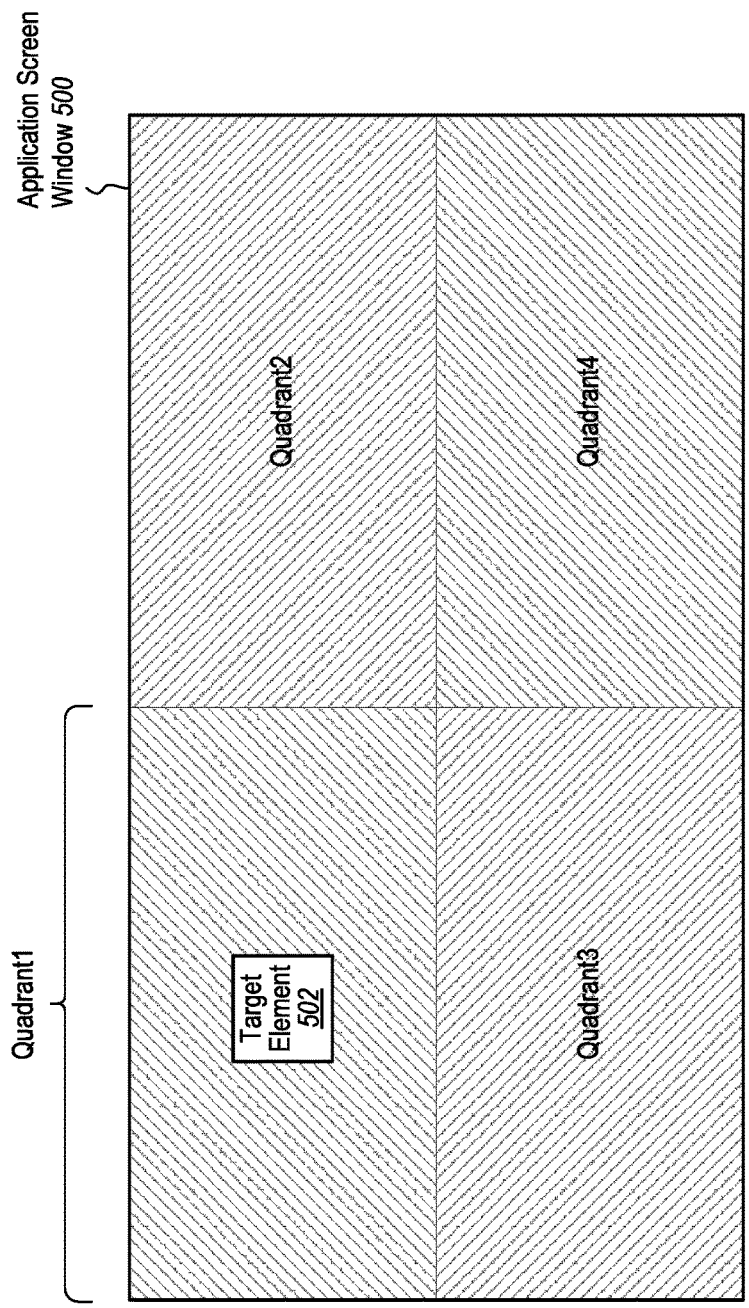
FIG. 5 shows a target element residing entirely within a single quadrant.

After the four quadrants are created, the embodiments then find the quadrant number in which the target element resides (i.e. the quadrant(s) in which the target element's boundaries are located within). For example, FIG. 5 shows an application screen window 500 that has been divided into four quadrants (e.g., Quadrant1, Quadrant2, Quadrant3, and Quadrant4) according to the manner described above. FIG. 5 also shows a target element 502. This target element 502 is displayed as being located within Quadrant1. Although FIG. 5 shows the target element 502 as being in Quadrant1, this may not always be the case. For example, in other instances, the target element 502 may be located within any one of the other quadrants, or alternatively, the target element 502 may span multiple quadrants at a given period of time. In any event, the embodiments determine where the target element 502 is residing.

In the disclosed embodiments, the computing system employs a bubble auto positioning algorithm that determines two aspects related to the popup interface's position. These two aspects are introduced below.

First, this algorithm determines a generalized "best fit" position of the popup interface relative to the target element. To clarify, the algorithm initially determines whether the popup interface is to be generally displayed at a top, right, bottom, or left position relative to the target element. As used herein, this first determination (i.e. determining the generalized best fit location) is generally referred to as determining a "bubble overlay position." For example, FIG. 5 shows the target element 502 as being in Quadrant1, which is located in an upper left portion of the application screen window 500. Under this first determination analysis, the embodiments determine whether the resulting popup interface will be best placed at a position (i.e. the bubble overlay position) that is located either to the left, right, top, or bottom of the target element 502.

Using the scenario presented in FIG. 5, because the target element 502 is located in an upper left portion of the application screen window 500 (i.e. in Quadrant1), the embodiments will determine that (due to realty/space availability) the top and left positions are likely not ideal for the display of a popup interface (e.g., because the popup interface may be cutoff due to a lack of available display realty/space in those areas). Therefore, the embodiments will determine that the resulting popup interface will be best placed in either the bottom or right position with respect to the current position of the target element 502. Accordingly, in this scenario, the first aspect of the bubble auto positioning algorithm determines that the bubble overlay position is to be either at the bottom or right of the target element 502. After determining the bubble overlay position, some embodiments will further refine exactly where that popup interface will be positioned. For example, after determining that a popup interface is to be located at a bottom position relative to the target element 502, these embodiments are able to analyze the underlying content contained within the user interface and then place the popup interface at a location that will minimize the amount of user interface content that will be occluded by the popup interface. As a result, these embodiments maximize an amount of viewable content for both the underlying user interface and the popup interface.

Other embodiments factor in different aspects when determining the exact location of a resulting popup interface. For example, after determining that a popup interface is to be located at a bottom position relative to the target element 502, some embodiments will adjust where the popup interface will be displayed so that none of the popup interface is cutoff or occluded within the computer's screen. Further detail is provided later on some of the processes that are used when considering the specific location of a popup location.

As indicated above, the bubble auto positioning algorithm calculates two aspects. While the first aspect was related to a generalized best fit location of the popup interface, the second aspect is related to the popup interface's specific, or rather exact, location coordinates on the screen window of the application. This aspect will be discussed in more detail later.

Figure 6:
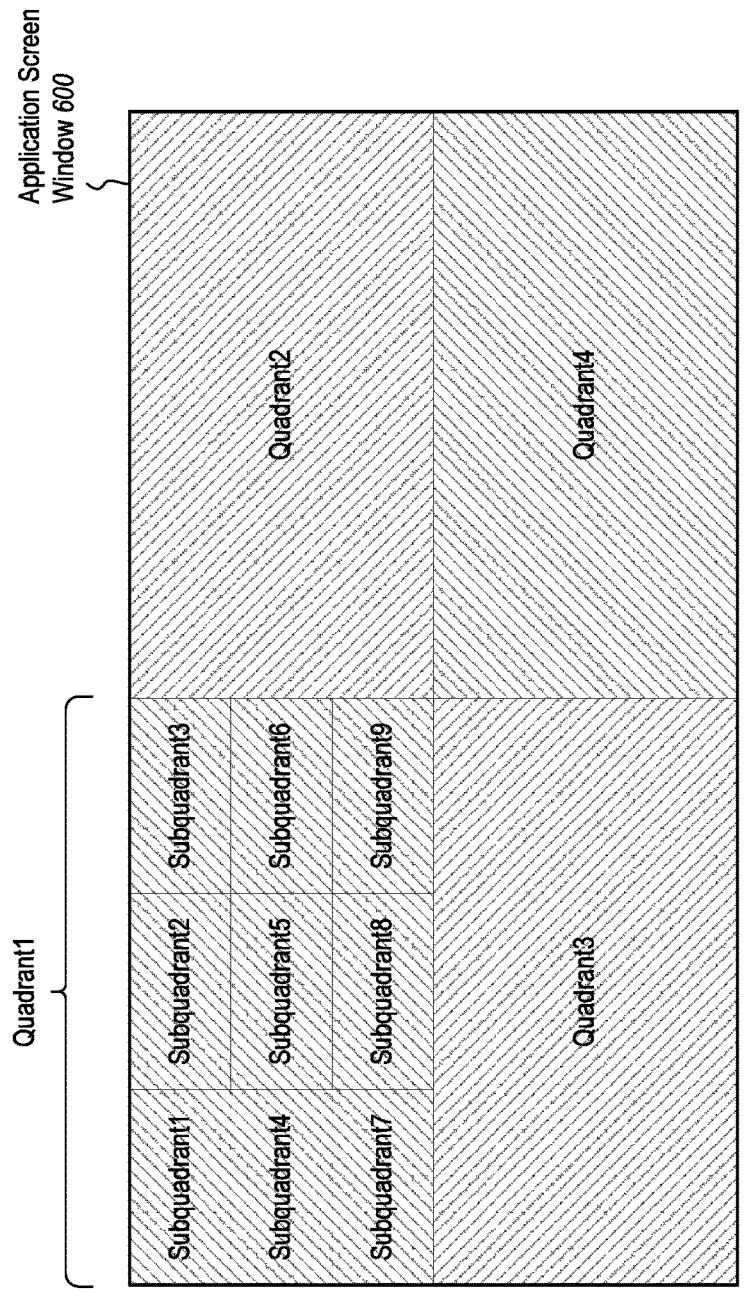
FIG. 6 shows a quadrant that has been subdivided into a plurality of sub quadrants.

To summarize, if the target element 502 resides in:
Quadrant1: then the bubble overlay position is either bottom or right
Quadrant2: then the bubble overlay position is either bottom or left
Quadrant3: then the bubble overlay position is either top or right
Quadrant4: then the bubble overlay position is either top or left As shown in FIG. 6, in some instances, the embodiments will subdivide one or more of the overall quadrants into nine subquadrants of equal size. In particular, FIG. 6 shows an application screen window 600 that has been divided into four Quadrants (i.e. Quadrant1, Quadrant2, Quadrant3, and Quadrant4). Further, Quadrant1 has been subdivided into nine different subquadrants (i.e. Subquadrant1, Subquadrant2, Subquadrant3, Subquadrant4, Subquadrant5, Subquadrant6, Subquadrant1, Subquadrant8, and Subquadrant9). After performing this subdivision, the embodiments cause these subquadrants to be labeled as Subquadrant1, Subquadrant2, Subquadrant3, and so on till Subquadrant9.

Figure 7:
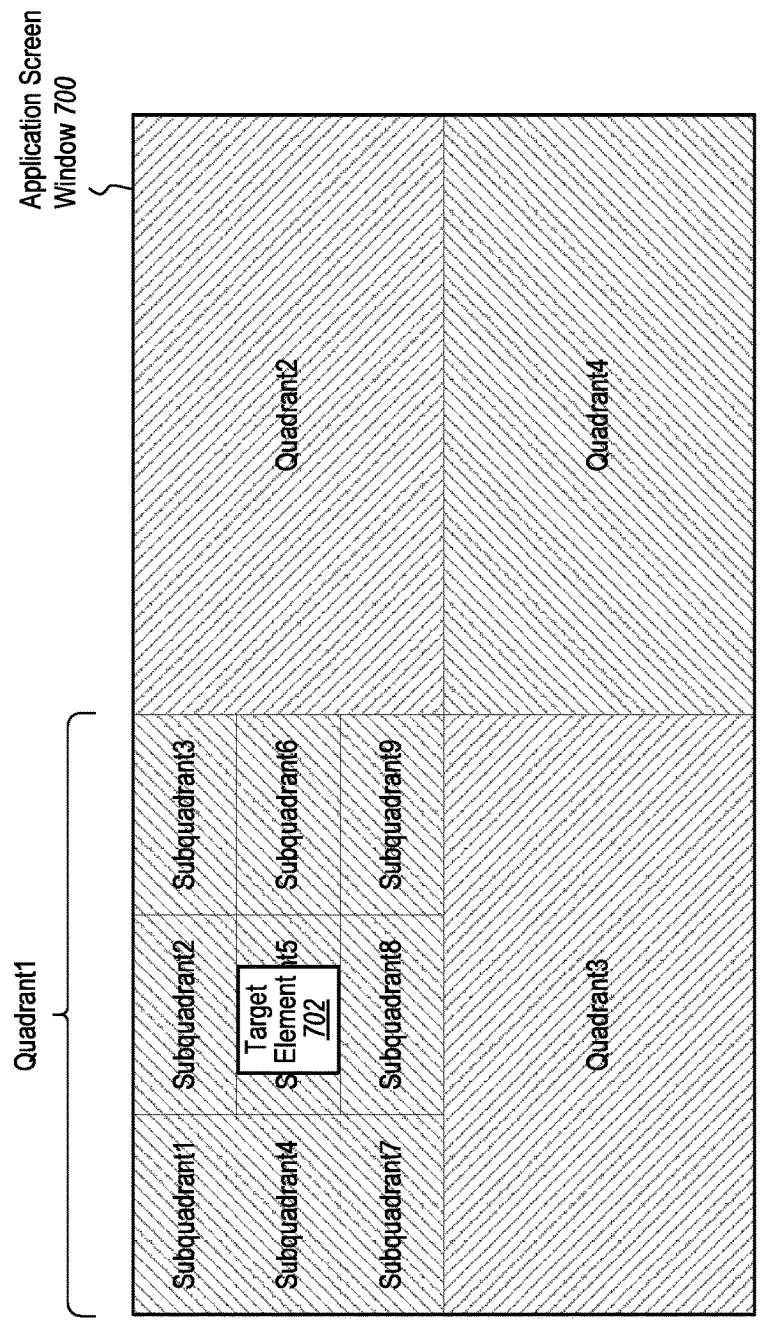
FIG. 7 shows a target element residing within at least one of the sub quadrants.

The disclosed systems also find the subquadrant number of the quadrant in which the target element resides. For example, FIG. 7 shows an application screen window 700 that has been divided and subdivided in a manner similar to the application screen window 600 of FIG. 6. Notably, however, FIG. 7 also includes the target element 702. From FIG. 7, it is discernable that the target element 702 is residing entirely within Subquadrant5. Although FIG. 7 shows that the target element 702 is residing within only a single quadrant and only a single subquadrant, the embodiments support a variety of situations. For example, in some instances, the target element 702 may span multiple quadrants (e.g., perhaps Quadrant1 and Quadrant2). Further, in some instances, the target element 702 may span multiple subquadrants (e.g., perhaps Subquadrant5 and Subquadrant6).

Continuing with the analysis, the bubble overlay position is calculated based on the quadrant and subquadrant number in which the target element resides. This process is described as below:

a. For Quadrant1
[Subquadrant1 to Subquadrant5]: Bubble overlay position is bottom.
[Subquadrant6 to Subquadrant9]: Bubble overlay position is right.

b. For Quadrant2
[Subquadrant1 to Subquadrant5]: Bubble overlay position is bottom.
[Subquadrant6 to Subquadrant9]: Bubble overlay position is left.

c. For Quadrant3
[Subquadrant1 to Subquadrant5]: Bubble overlay position is top.
[Subquadrant6 to Subquadrant9]: Bubble overlay position is right.

d. For Quadrant4
[Subquadrant1 to Subquadrant5]: Bubble overlay position is top.
[Subquadrant6 to Subquadrant9]: Bubble overlay position is left.

If the target element completely falls within a single overall quadrant, then the bubble overlay position will be calculated based on both the quadrant and subquadrant number as described above. An example of the above analysis is illustrated in FIG. 8.

Figure 8:
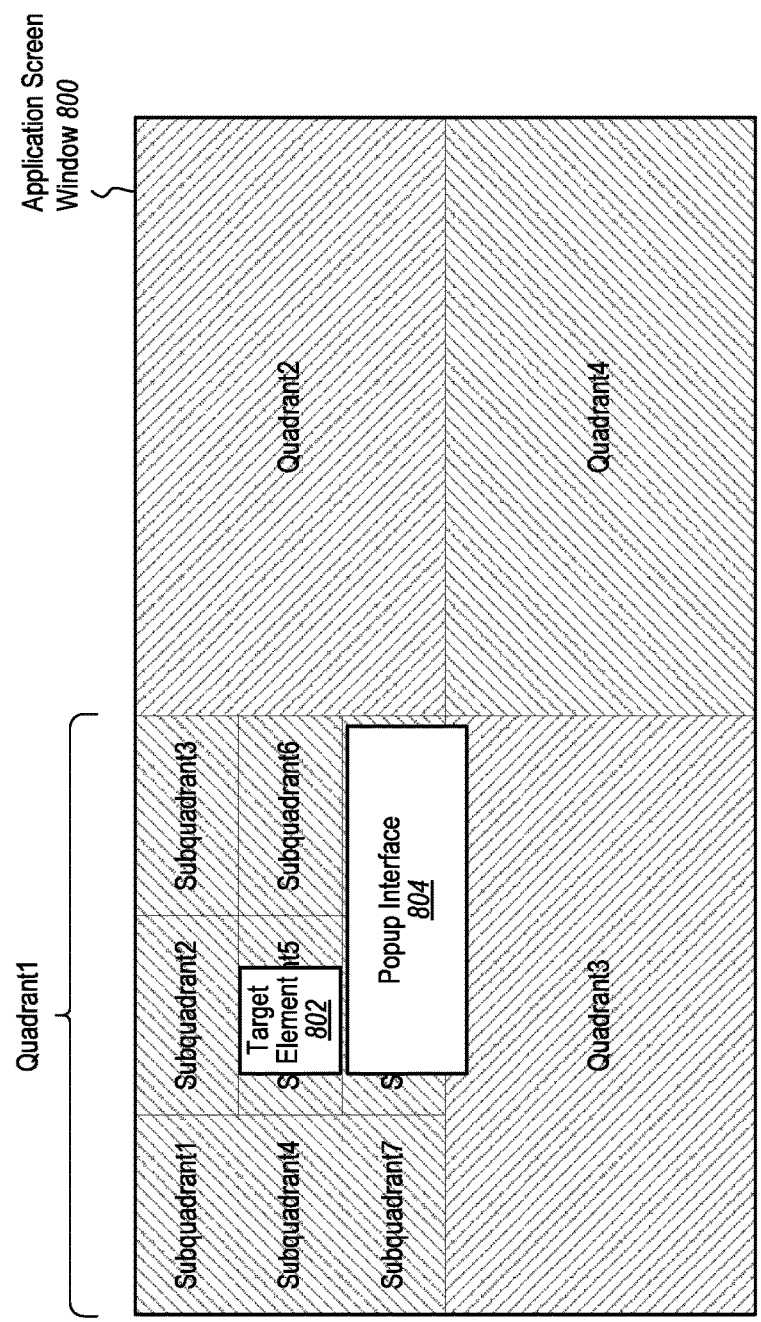
FIG. 8 a popup interface that is displayed in response to a target element residing in at least one of the subquadrants.

In particular, FIG. 8 shows an application screen window 800 that has been divided and subdivided into a plurality of quadrants and subquadrants in the manner described previously. FIG. 8 also illustrates a target element 802. As shown, this target element 802 is residing within Subquadrant5. Therefore, following the analysis from above, any resulting popup interface that is linked, or triggered, by the target element 802 will be displayed at a position underneath (or BOTTOM to) the target element 802. Accordingly, FIG. 8 shows a popup interface 804 being displayed at a bottom position relative to the target element 802.

It is possible that a target element might span multiple subquadrants. Using FIG. 7 as an example, if the target element 702 were to span both subquadrant5 and subquadrant6 (as opposed to residing in only subquadrant5), then the system will able to determine which subquadrant the target element 702 is predominantly located within (e.g., where a majority of the target element's boundaries are located). Based on this determination, the system will then determine the bubble overlay position in the manner described above (e.g., for Quadrant1 and subquadrant1 to subquadrant5, the bubble overlay position is bottom, etc.).

Figure 9:
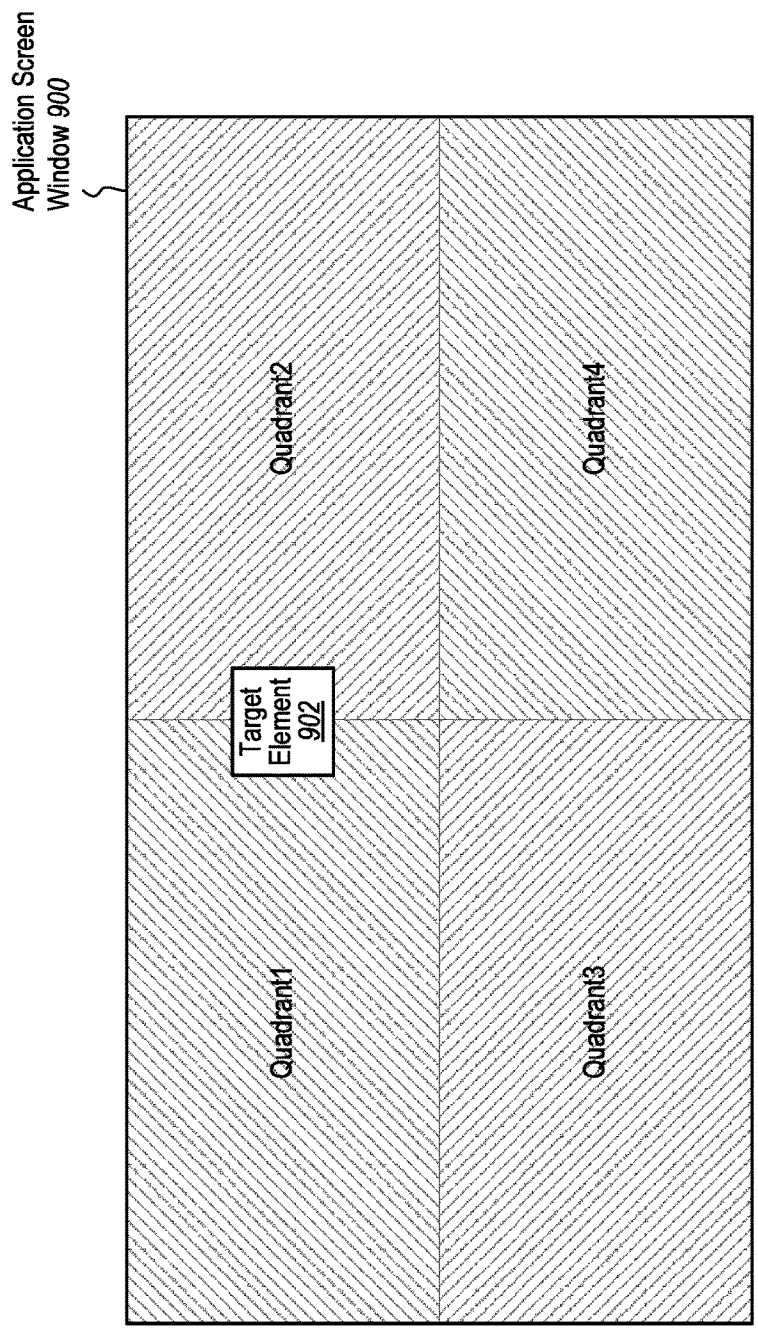
FIG. 9 illustrates a target element spanning multiple quadrants.

It is also possible that a target element might span multiple quadrants. As a result, that target element will not completely reside within a single quadrant. FIG. 9 illustrates such an instance. In particular, FIG. 9 illustrates an application screen window 900 that has been divided into a plurality of quadrants according to the manner described earlier. FIG. 9 also illustrates a target element 902. Notably, this target element 902 is illustrated as spanning both Quadrant1 and Quadrant2. By "spanning," it is meant that at least a portion of the target element is located within a particular quadrant. Accordingly, target element 902 spans both Quadrant1 and Quadrant2 because a portion of the target element 902 is within Quadrant1 and a portion of the target element 902 is within Quadrant2.

For such scenarios in which a target element spans multiple quadrants, the bubble overlay position is decided as follows: (a) If the target element spans Quadrant1 and Quadrant2, then the bubble overlay position is bottom; (b) If the target element spans Quadrant3 and Quadrant4, then the bubble overlay position is top; (c) If the target element spans Quadrant1 and Quadrant3, then the bubble overlay position is right; and (d) If the target element spans Quadrant2 and Quadrant4, then the bubble overlay position is left.

An additional scenario exists when the target element is located in the middle of the application's screen such that it spans all four quadrants. When presented with such a situation (e.g., where the target element spans all four quadrants), the embodiments are able to perform a variety of different actions. For example, the system will, in some instances, determine which two of the four quadrants the target element is predominantly located in and then use those two quadrants to complete the analysis just described (e.g., if the target element predominantly spans Quadrant1 and Quadrant2, then the bubble overlay position is bottom, etc.). By way of example, suppose the target element spans all four quadrants, but a majority of the target element's boundaries lie within Quadrant2 and Quadrant4. After determining that a majority of the target element's boundaries lie within Quadrant2 and Quadrant4, the system will set the bubble overlay position to left. In other embodiments, the system will perform different actions when confronted with a target element that spans all four quadrants. For instance, in some embodiments, the system will selectively choose a predetermined quadrant to serve as the default quadrant based on one or more settings. Some of these settings may include various user settings (e.g., a particular user configuration or preference). In other embodiments, a default quadrant is chosen based on an anticipated movement of the target element. For example, in situations in which a user is scrolling the application's screen window, these embodiments are able to determine the direction of the scroll and then set a default quadrant based on the scrolling direction (e.g., a quadrant opposite of the direction the user is scrolling).

In some embodiments, the system will also set a default quadrant based on an amount of page content that is currently being displayed. To clarify, suppose that Quadrant2 (i.e. the upper-right quadrant) is densely packed with application content while Quadrant1 (i.e. the upper-left quadrant) is not as densely packed. The system will analyze the amount of content located within each quadrant and then choose a quadrant that will minimize the amount of occluded application content when the resulting popup interface is displayed. In this example, the system will determine that if the popup interface were to be displayed in Quadrant2

(i.e. the more densely packed quadrant), then more content will be occluded. Accordingly, the system will determine that this occlusion is undesired and will choose a less densely packed quadrant (i.e. Quadrant1) to display the popup. Accordingly, the embodiments are able to use a variety of processes in selecting a default quadrant when presented with a scenario in which a target element spans all four quadrants.

Figure 10:
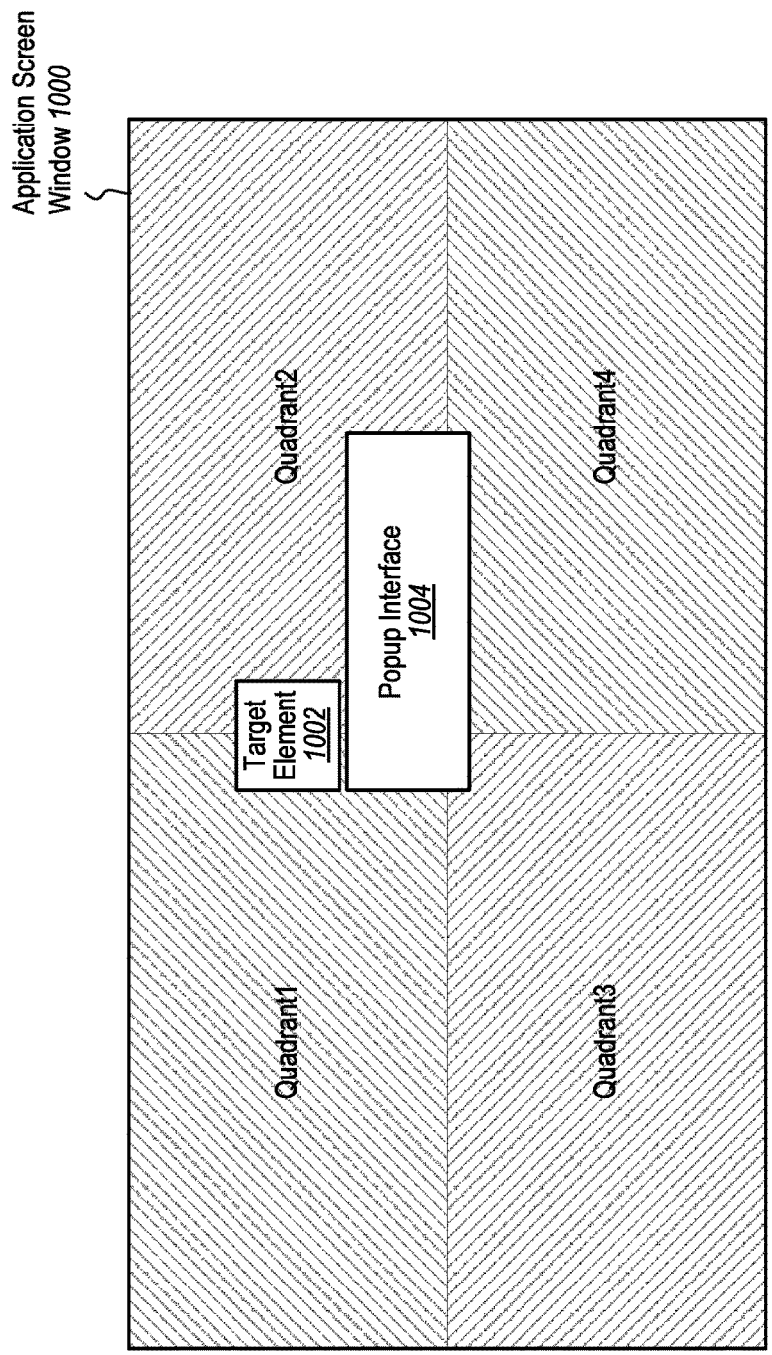
FIG. 10 illustrates a resulting popup interface that corresponds to a target element that spans multiple quadrants.

Another example is presented in FIG. 10. In particular, FIG. 10 illustrates an application screen window 1000 that has been divided into a plurality of quadrants according to the manner described previously. FIG. 10 also shows a target element 1002 that spans both Quadrant1 and Quadrant2. Therefore, following the analysis described above, any resulting popup interface (e.g., popup interface 1004) will be displayed in a bottom position relative to the target element 1002. Accordingly, the popup interface 1004 is displayed underneath (or "bottom" to) the target element 1002. Although FIG. 10 illustrates one scenario in which the target element 1002 spans only Quadrant1 and Quadrant2, the embodiments taught herein are applicable to any of the circumstances discussed above.

As discussed above, the bubble auto positioning algorithm determines two aspects. One aspect is related to the bubble overly position while the other aspect is related to the popup interface's location coordinates. The following disclosure is a more detailed description of the steps associated with determining those two aspects.

STEP 1: The disclosed system will, in some instances, label and name 1) the target element, 2) the popup interface, and 3) the application screen attributes that will be used during any of the following calculations/determinations.

Figure 11:
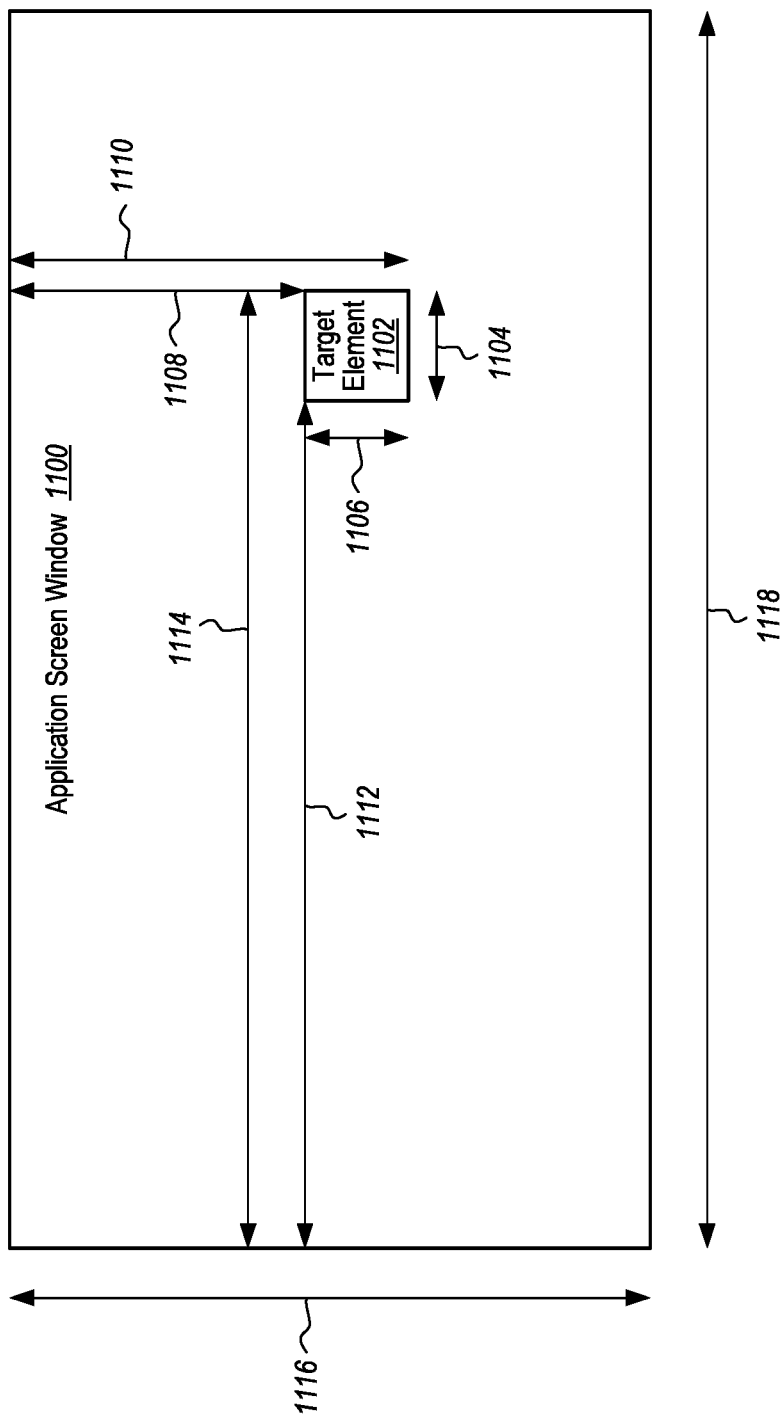
FIG. 11 provides detail on how a target element's specific location coordinates are determined.

As shown in FIG. 11, an application screen window 1100 includes a target element 1102. This target element 1102 is illustrated as being a rectangle having certain width 1104 and height 1106 in the application screen window 1100. Further, this target element 1102 is displayed as having certain top offset location coordinates (e.g., elementStartTopOffset 1108 and elementEndTopOffset 1110) and certain left offset location coordinates (e.g., elementStartLeftOffset 1112 and elementEndLeftOffset 1114). FIG. 11 also shows that the application screen window 1100 has a screenHeight 116 and a screenWidth 1118.

Although not shown, a popup interface may also be characterized as an overlay frame or rectangle (similar to the target element 1102) and will also include a certain width, height, top offset location coordinates, and left offset location coordinates. Here, it is worthwhile to note that shapes other than rectangles can also be used.

Different attributes involved in the calculation of a popup interface's bubble overlay position and location coordinates (i.e. top offset location coordinates and left offset location coordinates) can be assigned, labeled, or otherwise indexed in the following manner:

screenWidth=width of the application screen window,
screenHeight=height of the application window,
elementWidth=width of the target element,
elementHeight=height of the target element,
elementStartTopOffset=top offset value of the target element's top starting coordinate (e.g., elementStartTopOffset 1108 in FIG. 11),
elementStartLeftOffset=left offset value of the target element's left starting coordinate (e.g., elementStartLeftOffset 1112 in FIG. 11),
elementEndTopOffset=top offset value of the target element's top ending coordinate (e.g., elementEndTopOffset 1110 in FIG. 11),
elementEndLeftOffset=left offset value of the target element's left ending coordinate (e.g., elementEndLeftOffset 1114 in FIG. 11),
bubbleWidth=width of the popup interface,
bubbleHeight=height of the popup interface,
bubbleTopOffset=top offset value of the popup interface's top starting coordinate (e.g., similar to the target element's elementStartTopOffset 1108 in FIG. 11 but for the popup interface),
bubbleLeftOffset=left offset value of the popup interface's left starting coordinate (e.g., similar to the target element's elementStartLeftOffset 1112 in FIG. 11 but for the popup interface),
bubbleDirection=the bubble overlay position (e.g., top, bottom, left, or right).

STEP 2: The disclosed system will divide the application screen window into four quadrants (as in FIG. 4). The quadrant attributes can be assigned, labelled, and/or indexed according to the following:

quadrantNumber=quadrant number(s) in which the target element resides. In other words, this value is the quadrant(s) in which the target element's top starting (e.g., elementStartTopOffset 1108 in FIG. 11) and left starting (e.g., elementStartLeftOffset 1112 in FIG. 11) coordinates reside and the quadrant(s) in which the target element's top ending (e.g., elementEndTopOffset 1110 in FIG. 11) and left ending (e.g., elementEndLeftOffset 1114 in FIG. 11) coordinates reside,
quadrantStartTopOffset=top offset value of the quadrant's top starting coordinate,
quadrantStartLeftOffset=left offset value of the quadrant's left starting coordinate,
quadrantEndTopOffset=top offset value of the quadrant's top ending coordinate,
quadrantEndLeftOffset=left offset value of the quadrant's left ending coordinate,
spanacross=FALSE by default. Set to TRUE if the target element spans multiple quadrants.

As discussed above, an application's screen window may be divided into four quadrants of equal size. Then, the embodiments determine which quadrant the target element resides. If the target element completely resides within a single quadrant, then the quadrantNumber value will be one of the following values, "Quadrant1," "Quadrant2," "Quadrant3," or "Quadrant4." For example, if the target element resides completely within Quadrant3, then the quadrantNumber value will be equal to "Quadrant3" and so on. If the target element spans multiple different quadrants, then the embodiments set the attribute "spanacross" to TRUE and specify the two quadrants in the quadrantNumber value. For example, if the target element spans Quadrant1 and Quadrant2, then the quadrantNumber value will be equal to "Quadrant1AND2" and so on.

STEP 3: The disclosed systems will also determine the quadrant number(s) in which the target element either completely resides within or spans.

Using the attributes of 1) the target element and 2) the application's screen window, which attributes were defined in STEP1 and STEP2, the embodiments find the quadrantNumber and the "quadrantStart" and "quadrantEnd" top and left offset location coordinates based on different case conditions. Using the scenario presented in FIG. 9 as an example, the embodiments will determine that the target element's quadrantStart value is Quadrant1 and that the quadrantEnd value is Quadrant2.

Next, the cases are evaluated in order from case a) down to case h) as listed below. First, case a) is evaluated. If this case's condition is evaluated to TRUE, then the remaining cases (i.e. cases b) through h)) are not evaluated. If case a)'s condition is not TRUE, then case b) will be evaluated and so on.

A listing of the different cases, case a) through case h), which cases are evaluated in the ordering described above, will now be discussed.

Case a): The embodiments check whether the target element resides only in Quadrant1 and then set the quadrant attributes as shown below:

```
if (elementStartLeftOffset < screenWidth/2 AND
    elementStartTopOffset < screenHeight/2 AND
    elementEndLeftOffset< screenWidth/2 AND
    elementEndTopOffset < screenHeight/2)
{
    quadrantNumber = "Quadrant1"
    quadrantStartTopOffset = 0
    quadrantStartLeftOffset = 0
    quadrantEndTopOffset = screenHeight/2
    quadrantEndLeftOffset = screenWidth/2
}
```

Case b): If not case a), then the embodiments check whether the target element spans Quadrant1 and Quadrant3 and then set the attributes as shown below:

```
if (elementStartLeftOffset < screenWidth/2 AND
    elementStartTopOffset < screenHeight/2 AND
    elementEndLeftOffset < screenWidth/2)
{
    quadrantNumber = "Quadrant1AND3"
    spanacross = TRUE
}
```

Case c): If not case a) or case b), then the embodiments check whether the target element spans Quadrant1 and Quadrant2 and then set the attributes as shown below:

```
if (elementStartLeftOffset < screenWidth/2 AND
    elementStartTopOffset < screenHeight/2 AND
    elementEndTopOffset < screenHeight/2)
{
    quadrantNumber = "Quadrant1AND2"
    spanacross = TRUE
}
```

Case d): If not the above cases, then the embodiments check whether the target element resides entirely in Quadrant2 and then set the attributes as shown below:

```
if (elementStartTopOffset < screenHeight/2 AND
    elementEndTopOffset < screenHeight/2)
{
    quadrantNumber = "Quadrant2"
    quadrantStartTopOffset = 0
    quadrantStartLeftOffset = screenWidth/2 + 1
    quadrantEndTopOffset = screenHeight/2
    quadrantEndLeftOffset = screenWidth
}
```

Case e): If not the above cases, then the embodiments check whether the target element spans Quadrant2 and Quadrant4 and then set the attributes as shown below:

```
if (elementStartTopOffset < screenHeight/2)
{
    quadrantNumber = "Quadrant2AND4"
    spanacross = TRUE
}
```

Case f): If not the above cases, then the embodiments check whether the target element resides entirely in Quadrant3 and then set the attributes as shown below:

```
if (elementStartLeftOffset < screenWidth/2 AND
    elementEndLeftOffset < screenWidth/2)
{
    quadrantNumber = "Quadrant3"
    quadrantStartTopOffset = screenHeight/2 + 1
    quadrantStartLeftOffset = 0
    quadrantEndTopOffset = screenHeight
    quadrantEndLeftOffset = screenWidth/2
}
```

Case g): If not the above cases, then the embodiments check whether the target element spans Quadrant3 and Quadrant4 and then set the attributes as shown below:

```
if (elementStartLeftOffset < screenWidth/2)
{
    quadrantNumber = "Quadrant3AND4"
    spanacross = TRUE
}
```

Case h): If none of the above cases evaluate to TRUE, then it is certain that the target element resides entirely in Quadrant4. The embodiments then set the quadrant attributes as shown below:

quadrantNumber="Quadrant4"

quadrantStartTopOffset=screenHeight/2+1 quadrantStartLeftOffset=screenWidth/2+1 quadrantEndTopOffset=screenHeight quadrantEndLeftOffset=screenWidth

STEP 4: The disclosed systems will also check if "spanacross" is set to TRUE and then calculate the bubble overlay position and location coordinates (e.g., top offset location coordinates and left offset location coordinates) based on the attributes that were defined above.

As indicated, in some instances, the target element might span multiple overall quadrants. As a result, certain target elements located within the application screen's boundaries may not completely reside within a single quadrant. For such scenarios where a target element spans two different quadrants, the "spanacross" attribute is set to TRUE in STEP3 by this time. The bubble overlay position and location coordinates (e.g., top offset location coordinates and left offset location coordinates) are then calculated based on the quadrantNumber to which the target element spans as shown below in cases a) through d).

Case a): If spanacross is TRUE and quadrantNumber is "Quadrant1AND2," then the bubble overlay position is bottom, and the bubble top and left location coordinates are calculated as shown below:

```
if (spanacross = TRUE AND
quadrantNumber = "Quadrant1AND2")
{
    bubbleDirection = "Bottom"
    bubbleTopOffset = elementStartTopOffset + elementHeight
    bubbleLeftOffset = elementStartLeftOffset
}
```

Case b): If spanacross is TRUE and quadrantNumber is "Quadrant3AND4," then the bubble overlay position is top, and the bubble top and left location coordinates are calculated as shown below:

```
if (spanacross = TRUE AND
quadrantNumber = "Quadrant3AND4")
{
    bubbleDirection = "Top"
    bubbleTopOffset = elementStartTopOffset - bubbleHeight
    bubbleLeftOffset = elementStartLeftOffset
}
```

Case c): Similarly, if the quadrantNumber is "Quadrant1AND3," then the bubble overlay position is right, and the bubble top and left location coordinates are calculated as shown below:

```
if (spanacross = TRUE AND
quadrantNumber = "Quadrant1AND3")
{
    bubbleDirection = "Right"
    bubbleTopOffset = elementStartTopOffset
    bubbleLeftOffset = elementStartLeftOffset + elementWidth
}
```

Case d): Similarly, if the quadrantNumber is "Quadrant2AND4," then the bubble overlay position is left, and the bubble top and left location coordinates are calculated as shown below:

```
if (spanacross = TRUE AND
quadrantNumber = "Quadrant2AND4")
{
    bubbleDirection = "Left"
    bubbleTopOffset = elementStartTopOffset
    bubbleLeftOffset = elementStartLeftOffset - bubbleWidth
}
```

STEP 5: If "spanacross" is FALSE, then the system will further subdivide the quadrant into nine subquadrants and find the corresponding subquadrant number(s) in which the target element resides (as is shown in FIGS. 6-8).

If the spanacross attribute is not set to TRUE in STEP3, then the target element does not span two quadrants. Instead, spanacross value (as FALSE) indicates that the target element completely resides within a single quadrant. STEP3 gives the exact quadrantNumber in which the target element completely resides. Further, the quadrantStart and quadrantEnd top and left offset location coordinates provide the target element's specific coordinates.

As indicated above, to calculate the bubble overlay position and location coordinates (e.g., the top offset location coordinates and left offset location coordinates), the system will sometimes further subdivide a particular quadrant into nine subquadrants of equal size. These subquadrants are labeled as SubQuadrant1, SubQuadrant2, SubQuadrant3, and so on till SubQuadrant9 (as shown in FIG. 6).

The subquadrant attributes are labelled and defined as below:
  subQuadrantRow=the row number of the subquadrant where the target element's starting top offset location coordinate resides (value will be either 1, 2, or 3).
  subQuadrantColumn=the column number of the subquadrant where the target element's starting left offset location coordinate resides (value will be either 1, 2, or 3).
  subQuadrantNumber=subquadrant number of the quadrant in which the target element's starting top and starting left offset coordinates reside (value will be a particular value from range 1 to 9).

Next, the embodiments find the subQuadrantRow number in which the target element's elementStartTopOffset resides using quadrantStartTopOffset, quadrantEndTopOffset, and elementStartTopOffset. To perform this action, the embodiments utilize the following process.

Step I): Define the height range for the quadrant to which the target element belongs as a difference between quadrantEndTopOffset and quadrantStartTopOffset.

heightRange=quadrantEndTopOffset−quadrantStartTopOffset

Step II): Based on the heightRange value, decide the subQuadrantRow number as below:

```
if (elementStartTopOffset < quadrantStartTopOffset + heightRange/3)
{
    subQuadrantRow = 1
}
if (elementStartTopOffset < quadrantStartTopOffset + heightRange * 2/3)
{
    subQuadrantRow = 2
}
if (elementStartTopOffset < quadrantStartTopOffset + heightRange)
{
    subQuadrantRow = 3
}
```

Then, the embodiments find the subQuadrantColumn number in which the target element's elementStartLeftOffset resides using quadrantStartLeftOffset, quadrantEndLeftOffset, and elementStartLeftOffset. This process is performed in the following manner.

Step I): Define the width range for the quadrant in which the target element belongs as a difference between quadrantEndLeftOffset and quadrantStartLeftOffset.

widthRange=quadrantEndLeftOffset−quadrantStartLeftOffset

Step II): Based on the widthRange value, decide the subQuadrantColumn number as below:

```
if (elementStartLeftOffset < quadrantStartLeftOffset + widthRange/3)
{
    subQuadrantColumn = 1
}
if (elementStartLeftOffset < quadrantStartLeftOffset + widthRange * 2/3)
{
    subQuadrantColumn = 2
}
if (elementStartLeftOffset < quadrantStartLeftOffset + widthRange)
{
    subQuadrantColumn = 3
}
```

Next, the embodiments find the subQuadrantNumber in which the target element's elementStartTopOffset and elementStartLeftOffset coordinates reside using the above calculated subQuadrantRow and subQuadrantColumn values as:

$$subQuadrantNumber=(subQuadrantRow-1)*3+(subQuadrantColumn-1)+1$$

STEP6: The embodiments then find the bubble overlay position and location coordinates based on the quadrantNumber and subQuadrantNumber. If the target element completely resides within a single quadrant, then the bubble overlay position and location coordinates are decided based on the value of both quadrantNumber and subQuadrantNumber. The quadrantNumber is already calculated in STEP3, and its value will be one of the following values, "Quadrant1," "Quadrant2," "Quadrant3," or "Quadrant4." The subQuadrantNumber is already calculated in STEPS, and its value will be a particular value within a range of 1 to 9. The bubble overlay position and location coordinates (e.g., "bubbleTopOffset" and "bubbleLeftOffset") are then calculated based on quadrantNumber and subQuadrantNumber as shown in cases a) through d) below.

Case a): For subquadrant ranges 1 to 5, the bubble overlay position is bottom for both Quadrant1 and Quadrant2, and the popup interface's top and left location coordinates are calculated as shown below:

```
if (subQuadrantNumber >= 1 AND
subQuadrantNumber <= 5 AND
(quadrantNumber = "Quadrant1" OR quadrantNumber = "Quadrant2"))
{
    bubbleDirection = "Bottom"
    bubbleTopOffset = elementStartTopOffset + elementHeight
    expectedBubbleEndLeftOffset = elementStartLeftOffset +
    bubbleWidth
    if (expectedBubbleEndLeftOffset > screenWidth)
    {
        bubbleLeftOffset = screenWidth - bubbleWidth
    }
    if (expectedBubbleEndLeftOffset <= screenWidth)
    {
        bubbleLeftOffset = elementStartLeftOffset
    }
}
```

Case b): For subquadrants 1 to 5, the bubble overlay position is top for both Quadrant3 and Quadrant4, and the popup interface's top and left location coordinates are calculated as shown below:

```
if (subQuadrantNumber >= 1 AND
subQuadrantNumber <= 5 AND
(quadrantNumber = "Quadrant3" OR quadrantNumber = "Quadrant4"))
{
    bubbleDirection = "Top"
    bubbleTopOffset = elementStartTopOffset - bubbleHeight
    expectedBubbleEndLeftOffset = elementStartLeftOffset +
    bubbleWidth
    if (expectedBubbleEndLeftOffset > screenWidth)
    {
        bubbleLeftOffset = screenWidth - bubbleWidth
    }
    if (expectedBubbleEndLeftOffset <= screenWidth)
    {
        bubbleLeftOffset = elementStartLeftOffset
    }
}
```

Case c): For subquadrants 6 to 9, the bubble overlay position is right for both Quadrant1 and Quadrant3, and the popup interface's top and left location coordinates are calculated as shown below:

```
if (subQuadrantNumber >= 6 AND
subQuadrantNumber <= 9 AND
(quadrantNumber = "Quadrant1" OR quadrantNumber = "Quadrant3"))
{
    bubbleDirection = "Right"
    bubbleLeftOffset = elementStartLeftOffset + elementWidth
    expectedBubbleEndTopOffset = elementStartTopOffset +
    bubbleHeight
    if (expectedBubbleEndTopOffset <= screenHeight)
    {
        bubbleTopOffset = elementStartTopOffset
    }
    if (expectedBubbleEndTopOffset > screenHeight)
    {
        bubbleTopOffset = screenHeight - bubbleHeight
    }
}
```

Case d): For subquadrants 6 to 9, the bubble overlay position is "left" for both Quadrant2 and Quadrant4, and the popup interface's top and left location coordinates are calculated as shown below:

```
if (subQuadrantNumber >= 6 AND
subQuadrantNumber <= 9 AND
(quadrantNumber = "Quadrant2" OR quadrantNumber = "Quadrant4"))
{
    bubbleDirection = "Left"
    bubbleLeftOffset = elementStartLeftOffset - bubbleWidth
    expectedBubbleEndTopOffset = elementStartTopOffset +
    bubbleHeight
    if (expectedBubbleEndTopOffset <= screenHeight)
    {
        bubbleTopOffset = elementStartTopOffset
    }
    if (expectedBubbleEndTopOffset > screenHeight)
    {
        bubbleTopOffset = screenHeight - bubbleHeight
    }
}
```

It will be appreciated that the foregoing processes are implemented by a computing system including one or more processors and computer-readable media such as computer memory. In particular, the computer memory may store computer-executable instructions that, when executed by one or more processors, cause various functions to be performed, such as acts associated with implementation of the foregoing processes.

Figure 12:
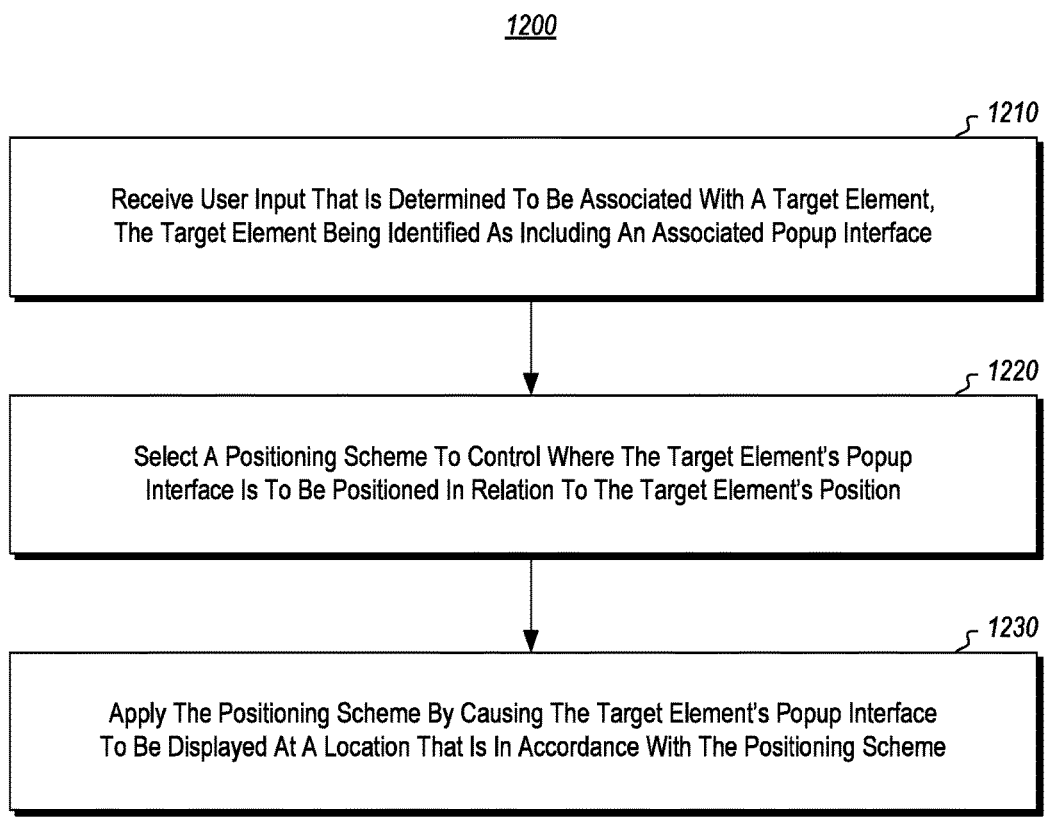
FIG. 12 illustrates an exemplary method for displaying a popup interface in a best fit location.
Figure 13:
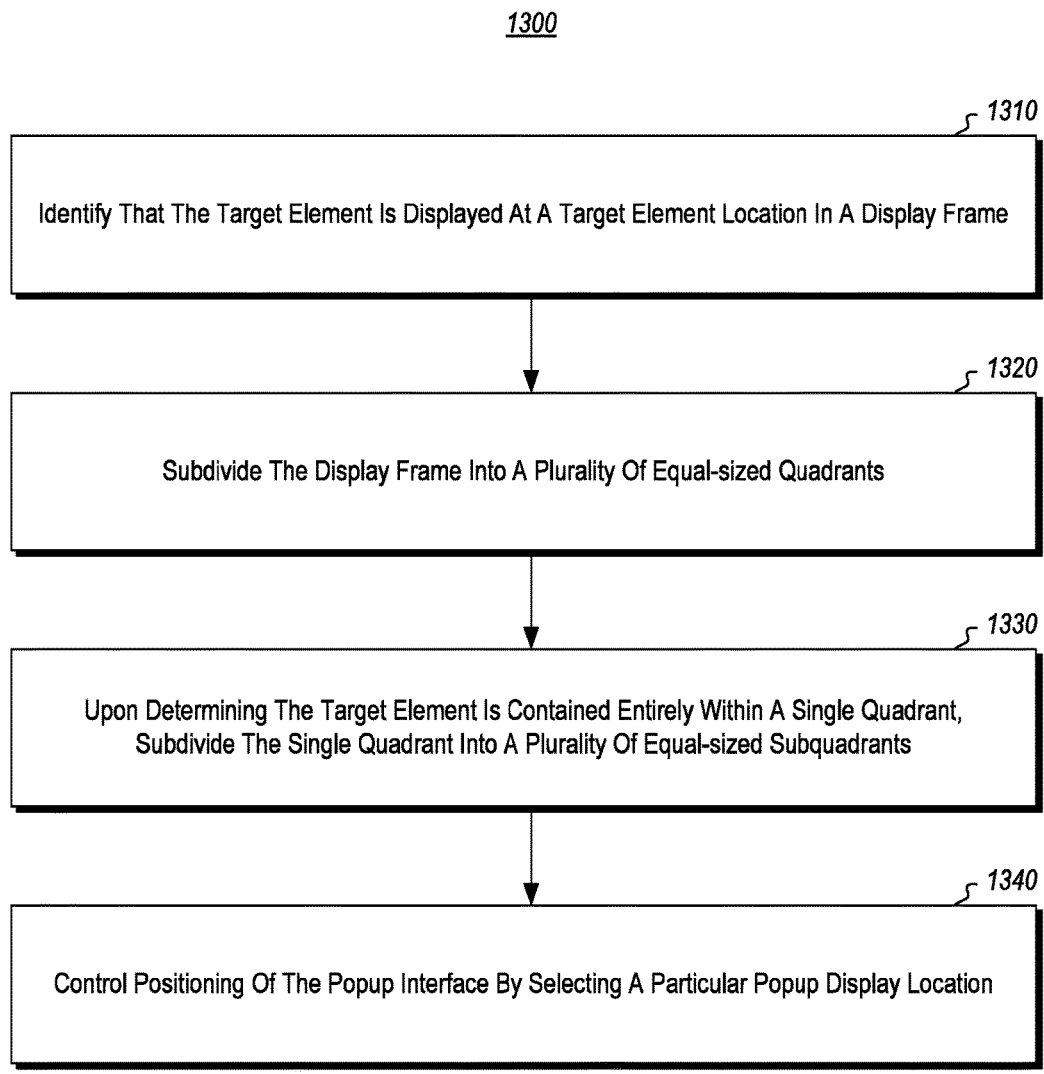
FIG. 13 illustrates another exemplary method for displaying a popup interface in a best fit location.
Figure 14:
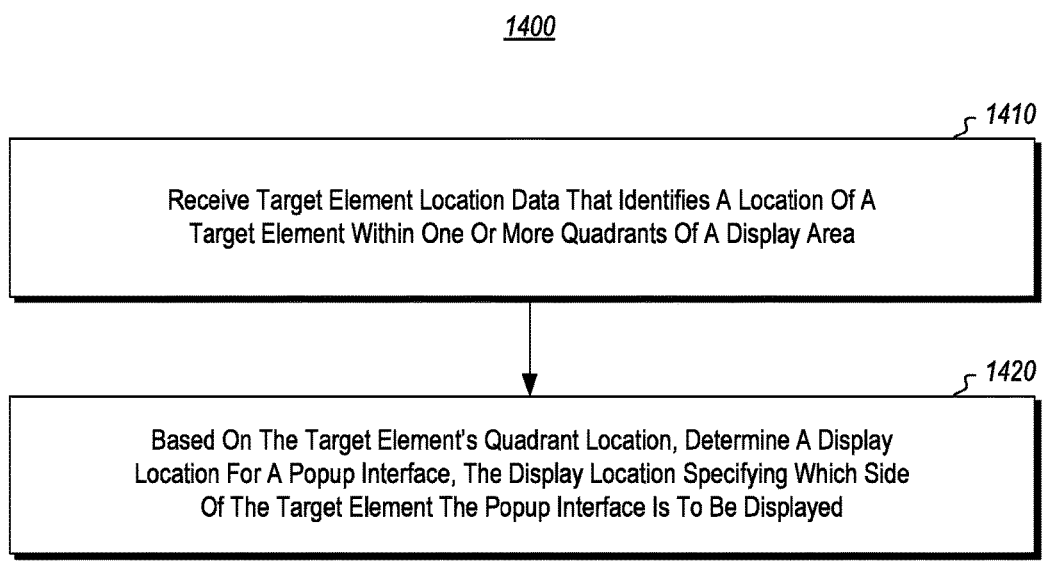
FIG. 14 illustrates another exemplary method for displaying a popup interface in a best fit location.

FIGS. 12-14 illustrate various exemplary methods that may be performed to accomplish the foregoing objectives. These methods are performed by a computer system, such as the computer system 200 in FIG. 2.

In particular, FIG. 12 illustrates an exemplary method 1200 for selectively positioning a popup interface within a display frame. This popup interface is displayed dynamically in response to receiving user input (e.g., a right click of a mouse, a positioning of a cursor so that it hovers over an element for a predetermined duration of time (e.g., 1 second, 2 seconds, 3 seconds, etc.) and/or a gesture or other input) at a user interface. This user input is associated with a target element that is associated with the popup interface. Method 1200 may include, for example, a plurality of acts that are implemented by a computing system (e.g., computer system 200 in FIG. 2) such as an act of displaying a user interface with one or more elements within a display frame of a display. In this instance, the one or more elements include a target element that is associated with a popup interface. This popup interface is rendered within the display frame in response to the user input that was received at the user interface and that is associated with the target element. As indicated previously, the target element can be a word, a tuple, an image, a graphical object, and/or any other element capable of being rendered by an interface.

As shown in FIG. 12, method 1200 includes an act (act 1210) of detecting, or rather receiving, the user input at the user interface. This user input is determined to be associated with the target element at a particular time in which the target element is displayed at a particular location within the display frame. Further, this target element is identified as including an associated popup interface. Here, this act is performed by the target location component 202 of the computer system 200. Additionally, this user input may comprise a hover input or another input (including a gesture with a gesture device, a mouse click, or any other input for selecting an element).

Method 1200 is also shown as including an act (act 1220) of selecting a positioning scheme to control where the target element's popup interface is to be positioned in relation to the target element's position. To clarify, this act includes identifying a plurality of positioning schemes that are operable for controlling a display position where the popup interface will be displayed relative to the target element and then selecting one such scheme. The plurality of positioning schemes are dependent upon the particular location within the display frame where the target element is displayed at the particular time in which the user input is received. Once identified, then a particular positioning scheme is selected. Here, this act is performed by the position determining component 206 of the computer system 200.

The plurality of positioning schemes may include a first positioning scheme that is selected as the particular positioning scheme when the target element is entirely located within a single quadrant (out of four quadrants of the display frame) at the particular time when the user input is received.

Further, the plurality of positioning schemes may also include a second positioning scheme that is selected as the particular positioning scheme when the target element spans at least two of the quadrants at the particular time when the user input is received.

As a result, a different positioning scheme is selected depending on whether the target element is contained entirely within a single quadrant or, alternatively, whether the target element spans multiple quadrants at the particular time when the user input is received.

Even further, the plurality of positioning schemes may also include other positioning schemes that are different than the first and second positioning schemes.

In some embodiments, the second positioning scheme also includes determining which two out of the four quadrants the target element is predominantly contained within. When this situation occurs, the popup interface is then selectively placed (or positioned) at one of four sides of the target element (e.g., top, right, bottom, or left). These embodiments determine which side to place the popup interface by determining which two out of the four equal quadrants the target element is predominantly contained within according to the processes described earlier in this disclosure.

In some embodiments, the first positioning scheme includes subdividing the single quadrant into nine subquadrants. When this situation occurs, the popup interface is then selectively positioned to one of four sides of the target element (e.g., top, right, bottom, or left). These embodiments determine which side to place the popup interface by determining 1) which of the four equal quadrants the target element is contained within and 2) which subquadrant of the nine subquadrants the target element is predominantly located within according to the processes described earlier in this disclosure.

Regardless of which schemes are available, a particular positioning scheme will be selected from the plurality of positioning schemes based on the particular location where the target element is displayed within the display frame at the particular time in which the user input is received.

The selected scheme will also be applied and used to display the popup interface at the display position based on the particular positioning scheme that was selected.

Although not shown in FIG. 12, the method 1200 may further include an act of detecting movement of the target element to a new location within the display frame and which causes the target element to be at least partially positioned within a new subquadrant that the target element was not previously located within. In view of this new location, the embodiments change a side of the target element (e.g., top, right, bottom, or left) in which the popup interface is displayed based on the target element being at least partially positioned within a new subquadrant.

Further, the method 1200 may also include an act of detecting movement of the target element to a new location within the display frame and which causes the target element to be at least partially positioned within a new quadrant that the target element was not previously located within. When this action occurs, then the embodiments change the particular positioning scheme used for controlling where the popup interface will be displayed relative to the target element based on the target element being at least partially positioned within a new quadrant.

In some instances, the movement is received while the popup interface is displayed. In other instances, the movement is received between different instances of rendering the popup interface.

When there are several target elements identified in an application's screen window (e.g., perhaps the application is a document processor that includes a plurality of hyperlinks), some embodiments apply the foregoing method for placing associated popup interfaces that are triggered for each of the different elements. Some embodiments render only a single popup at a time. In other embodiments, however, multiple popups are rendered simultaneously, such as on a multiuser interface that receives parallel input from multiple users concurrently, which parallel input triggers the display of multiple popups simultaneously. Also, a popup interface can be configured to remain open, until closed, such that multiple popup interfaces can be opened in serial and remain open simultaneously.

As discussed above, method 1200 includes an act (act 1220) of selecting a particular positioning scheme. Here, this selecting may be based on the target element's location as it is displayed within the display frame at the particular time in which the user input is received. Further, the plurality of positioning schemes may also include any of the positioning schemes described herein, as well as any other positioning schemes that are operable to control placement of a popup interface.

FIG. 12 also shows that the method 1200 includes an act (act 1230) of applying the positioning scheme by causing the target element's popup interface to be displayed at a location that is in accordance with the positioning scheme. To clarify, this act includes identifying the selected particular positioning scheme to be used for displaying the popup interface at a popup display location. This popup display location is positioned relative to the target element location within the display frame. This act is also performed by the position determining component 206 of the computer system 200 of FIG. 2.

FIG. 13 illustrates another exemplary method (method 1300) for selecting a popup display location for a popup interface. Similar to method 1200 of FIG. 12, method 1300 is also performed by a computer system (e.g., the computer system 200 of FIG. 2).

FIG. 13 illustrates that method 1300 includes an act (act 1310) of identifying a target element that is displayed at a target element location in a display frame. This act is performed by the target location component 202 of the computer system 200.

Method 1300 is also shown as including an act (act 1320) of subdividing the display frame into a plurality of equal-sized quadrants. Here, this act is performed by the quadrant division component 204 of the computer system 200.

Method 1300 also includes an act (act 1330) of subdividing the single quadrant into a plurality of equal-sized subquadrants upon determining that the target element is contained entirely within only a single quadrant of the plurality of equal-sized quadrants. This act is also performed by the quadrant division component 204 of the computer system 200.

Here, it is worthwhile to note that if the target element is only partially contained within a single quadrant of the plurality of equal-sized quadrants (e.g., the target element spans multiple quadrants), then no subdividing of the single quadrant is performed for determining a location of the popup interface. Instead, the popup interface is displayed according to the processes described above in which a target element spans multiple quadrants.

Method 1300 also includes an act (act 1340) of controlling the positioning of the popup interface by selecting a particular popup display location. This act is performed by the position determining component 206 of the computer system 200. Also, making this selection is based at least in part on which of the plurality of equal-sized subquadrants the target element is located within when the target element is entirely contained within a single quadrant and subdividing of the single quadrant occurs. Further, the particular popup display location specifies which side of the target element to display the popup interface.

Alternatively, the popup display location may be based on which of the quadrants the target element is partially contained within, when there is no subdividing. In some instances, the popup display location specifies that the popup interface will be displayed adjacent to the target element and at a particular side of the target element (e.g., top, right, bottom, or left).

As discussed earlier in this disclosure, the popup interface may be displayed in different positions relative to the target element. For example, if the target element is located at a top-left portion of the display frame (e.g., in Quadrant1 as in FIG. 5), then the popup interface will be displayed at either a bottom or right position relative to the target element. If, however, the target element is located in a top-right position of the display frame (e.g., Quadrant2 of FIG. 5), then the popup interface will be located either at a bottom or left position relative to the target element. Similarly, if the target element is at a bottom-left position (e.g., in Quadrant 3 of FIG. 5), then the popup interface will be displayed either at a top or right position. Lastly, if the target element is at a bottom-right position, then the resulting popup interface will be displayed either at a top or left position relative to the target element.

FIG. 14 shows another exemplary method (method 1400) for selecting a popup display location for a popup interface that is associated with a target element. Similar to the other methods, method 1400 is also performed by a local computer system (e.g., computer system 200) and/or a remote system.

In particular, method 1400 includes an act (act 1410) of receiving target element location data that identifies a location of the target element within one or more quadrants of a plurality of quadrants of a display area (which may be a display of a client system remotely located from the server). Here, this act is performed by the target location component 202 of the computer system 200.

Method 1400 also includes an act (act 1420) of determining a popup display location for the popup interface that is associated with the target element. Here, this act is performed by the position determining component 206 of the computer system 200. Additionally, the popup display location specifies which side of the target element to display the popup (e.g., top, right, bottom, or left). This determination is also based on which of the plurality of quadrants the target element is located within. In some instances, this determination further includes determining which of a plurality of subquadrants of the single quadrant the target element is located within upon determining that the target element is entirely within a single quadrant.

Although not shown in FIG. 14, in some instances, the method 1400 may further include receiving user input location data representing a location of user input. To clarify, the embodiments are able to receive user input and determine where that user input was received. For instance, if a user uses a mouse to click on the user interface, the embodiments are able to determine where the mouse click was performed on the user interface. As a result, the embodiments are able to determine user input location data for any input that is received. Additionally, the embodiments are able to determine a location of a target element within the user interface. After analyzing the target element location data and the user input location data, the embodiments may identify the location of the target element as being within a threshold distance of the location of the user input. Satisfying this threshold requirement can be used to trigger the determining act from above, for instance. After the determining is performed, the popup display location can be transmitted to the remote client or local client that is rendering the target element to know where to render the popup interface.

The present embodiments may be embodied in other specific forms without departing from its spirit or characteristics. The described embodiments are to be considered in all respects only as illustrative and not restrictive. The scope of the embodiments are, therefore, indicated by the appended claims rather than by the foregoing description. All changes which come within the meaning and range of equivalency of the claims are to be embraced within their scope.

What is claimed is:

1. A method for positioning a popup interface within a display frame of a user interface, the method being performed by one or more processors of a computer system, the method comprising:

receiving input at the user interface associated with a target element that is located at a target element location within the display frame of the user interface, the target element being at the target element location at a particular time during which the input is received, the target element also being associated with a particular popup interface;
dividing the display frame of the user interface into quadrants;
determining that the target element is at least partially located within at least one of the quadrants;
based on the target element being located within the at least one of the quadrants, selecting a particular positioning scheme for controlling positioning of the particular popup interface relative to the target element;
determining a popup display location by applying the selected particular positioning scheme;
analyzing underlying content contained within the display frame;
refining the display location based on an amount of viewable content for the underlying content and the popup display; and
displaying the particular popup interface at the determined and refined popup display location within the display frame.

2. A method for positioning a popup interface within a display frame of a user interface, the method being performed by one or more processors of a computer system, the method comprising:
receiving input at the user interface associated with a target element that is located at a target element location within the display frame of the user interface, the target element being at the target element location at a particular time during which the input is received, the target element also being associated with a particular popup interface;
dividing the display frame of the user interface into quadrants;
determining that the target element is at least partially located within at least one of the quadrants;
based on the target element being located within the at least one of the quadrants, selecting a particular positioning scheme for controlling positioning of the particular popup interface relative to the target element;
determining a popup display location by applying the selected particular positioning scheme;
displaying the particular popup interface at the determined and refined popup display location within the display frame;
wherein the plurality of positioning schemes includes:
a first positioning scheme that is selected as the particular positioning scheme when the target element is entirely located within a single quadrant, out of four equally-sized quadrants of the display frame, at the particular time when the input is detected; and
a second positioning scheme that is selected as the particular positioning scheme when the target element spans at least two of quadrants at the particular time when the input is detected,
whereby a positioning scheme is selected depending on whether the target element is contained entirely within the single quadrant or, alternatively, whether the target element spans multiple quadrants at the particular time when the input is received.

3. The method of claim 2, wherein the second positioning scheme includes:
determining which two out of the four quadrants the target element is predominantly contained within; and
positioning the particular popup interface selectively adjacent to one of four sides of the target element depending on which two out of the four quadrants the target element is predominantly contained within.

4. The method of claim 2, wherein the first positioning scheme includes:
subdividing the single quadrant into nine equally-sized subquadrants; and
positioning of the particular popup interface selectively to one of four sides of the target element depending on
(1) which of the four quadrants the target element is contained within and
(2) which subquadrant of the nine subquadrants the target element is predominantly located within.

5. The method of claim 4, wherein the method further includes:
detecting movement of the target element to a new location within the display frame which causes the target element to be at least partially positioned within a new subquadrant that the target element was not previously located within; and
selecting a different side of the target element for rendering the particular popup interface, the selecting being based on the target element being at least partially positioned within the new subquadrant.

6. The method of claim 2, wherein the method further includes:
detecting movement of the target element to a new location within the display frame which causes the target element to be at least partially positioned within a new quadrant that the target element was not previously located within; and
changing the particular positioning scheme used for controlling where the particular popup interface will be displayed relative to the target element based on the target element being at least partially positioned within the new quadrant.

7. The method of claim 1, wherein the input comprises a prompt being positioned to hover over the target element such that the input comprises a hover input.

8. The method of claim 1, wherein the input comprises a mouse click when a prompt is hovering over the target element such that the input comprises a mouse input.

9. A computer system comprising:
one or more processors; and
one or more computer-readable hardware storage media having stored thereon computer-executable instructions, the computer-executable instructions being executable by the one or more processors to implement a method for selecting a popup display location for a popup interface that is associated with a target element, the method comprising:
identifying that the target element is displayed at a target element location in a display frame;
subdividing the display frame into a plurality of equal-sized quadrants;
determining that the target element is contained entirely within a single quadrant of the plurality of quadrants;
upon determining that the target element is contained entirely within a single quadrant of the plurality of equal-sized quadrants, subdividing the single quadrant into a plurality of equal-sized subquadrants;
determining which of the plurality of equal-sized subquadrants the target element is located within; and
selecting a particular popup display location to control positioning of the popup interface, wherein the selecting is based at least in part on which of the plurality of equal-sized subquadrants the target element is located within, and wherein the particular popup display location specifies which side of the target element to display the popup interface.

10. The computer system of claim 9, wherein the method further includes:
   detecting movement of the target element to a new location within the display frame, wherein the target element, when positioned in the new location, is at least partially positioned within a new quadrant of the plurality of equal-sized quadrants.

11. The computer system of claim 10, wherein the method further includes:
   in response to the target element being positioned at the new location, selecting a different side of the target element for rendering the popup interface.

12. The computer system of claim 9, wherein the method further includes:
   in response to input associated with the target element, causing the popup interface to appear at the particular popup display location.

13. The computer system of claim 9, wherein the target element location is determined to be at a top-left portion of the display frame, and wherein the particular popup display location is either at a bottom position or a right position relative to the target element.

14. The computer system of claim 9, wherein the target element location is determined to be at a top-right portion of the display frame, and wherein the particular popup display location is either at a bottom position or a left position relative to the target element.

15. The computer system of claim 9, wherein, when the target element location is determined to be at a bottom-left position of the display frame, the particular popup display location is either at a top position or a right position relative to the target element, and wherein, when the target element location is determined to be at a bottom-right position of the display frame, the particular popup display location is either at a different top position or a left position relative to the target element.

16. A method for selecting a popup display location for a popup interface that is associated with a target element, the method being performed by one or more processors of a computer system, the method comprising:
   receiving target element location data that identifies a location of the target element within one or more quadrants of a plurality of quadrants of a display area;
   based on the target element being located within at least one of the quadrants, selecting a particular positioning scheme for controlling positioning of the particular popup interface relative to the target element;
   determining a particular popup display location for the popup interface by applying the selected particular positioning scheme, the particular popup display location specifying which side out of a plurality of sides of the target element is selected for displaying the popup interface, the determining being based on which of the plurality of quadrants the target element is located within;
   analyzing underlying content contained within the display area; and
   refining the display location based on an amount of viewable content for the underlying content and the popup display.

17. The method of claim 16, wherein the determining further includes, upon determining that the target element is entirely within a single quadrant, determining which of a plurality of subquadrants of the single quadrant the target element is located within.

18. The method of claim 16, wherein the target element is located at a top-left portion of the display area, and wherein the particular popup display location is either at a bottom position or a right position relative to the target element.

19. The method of claim 16, wherein the target element is a user interface element that is displayed within the display area.

20. The method of claim 16, wherein the method further includes:
   determining that the target element has moved, wherein the target element moved in response to a scrolling action associated with the display area; and
   in response to the target element moving, determining a new popup display location for the popup interface.

* * * * *